United States Patent [19]

Suzuki et al.

[11] Patent Number: 4,944,640
[45] Date of Patent: Jul. 31, 1990

[54] VERTICAL FEED TYPE BURNISHING DRILL

[75] Inventors: Yasuhiro Suzuki, Nagoya; Tuguo Yoshikawa, Okazaki; Kazuhiro Shibata, Kazuhiro; Akio Fukui, Toyohashi; Kiyotaka Shiga, Okazaki, all of Japan

[73] Assignees: Aisan kogyo Corporation, Ohbu; Fuji Seiko Corporation, Toyota, both of Japan

[21] Appl. No.: 404,354

[22] Filed: Sep. 7, 1989

[30] Foreign Application Priority Data

Jan. 10, 1989 [JP] Japan ................. 1-1490[U]

[51] Int. Cl.$^5$ ............................................. B23B 51/02
[52] U.S. Cl. ..................................... 408/211; 408/224; 408/229
[58] Field of Search ............... 408/211, 223, 224, 229, 408/230

[56] References Cited

U.S. PATENT DOCUMENTS

| | | | |
|---|---|---|---|
| 1,000,067 | 8/1911 | Bennett | 408/224 |
| 3,578,762 | 5/1971 | Siebol et al. | 408/224 |
| 3,977,807 | 8/1976 | Fiddall | 408/230 |

FOREIGN PATENT DOCUMENTS

| | | | |
|---|---|---|---|
| 62-65107 | 4/1987 | Japan . | |
| 62-72023 | 5/1987 | Japan . | |
| 278711 | 11/1988 | Japan | 408/229 |
| 1117815 | 8/1989 | Japan . | |
| 1117816 | 8/1989 | Japan . | |
| 1238905 | 6/1986 | U.S.S.R. | 408/230 |

Primary Examiner—Daniel Howell
Attorney, Agent, or Firm—Cushman, Darby & Cushman

[57] ABSTRACT

A burnishing drill having a drill body, the forward end of which is formed with a reduced-diameter portion having its external diameter smaller than the maximum external diameter of the drill body. The forward end of the drill body includes a pair of first cutting edges formed in the reduced-diameter to include with a first cutting angle, and a pair of second cutting edges formed to extend radially in a direction perpendicular to the first cutting edges at least from the inward position of a plane including the outermost peripheral walls of the first cutting edges to the position of another plane including the outermost peripheral wall of the drill body.

Each of the first cutting edges extends radially outward from the center of the forward end of the dril body and includes axially in the rearward direction while each of the second cutting edges inclines extends radially outward from the drill body and inclines axially in the forward direction.

3 Claims, 5 Drawing Sheets

VERTICAL FEED TYPE BURNISHING DRILL

BACKGROUND OF THE INVENTION

The present invention relates to a reamer section drill and more particularly to an improved vertical feed type burnishing drill.

Various types of drilling tools are known which are adapted to ream a hole of a desired diameter while cutting the wall of the hole. Such drilling tools are a single-purposed, exclusive and/or automated tool which can be increased in cutting efficiency and used to provide high-quality and uniform products.

Japanese Utility Model Laid-Open Application No. 62-65107 discloses a reamer section drill including two drilling edges and four reaming edges, all these edges being arranged in the same circle.

FIGS. 4 and 5 in the accompanying drawings show another burnishing drill. Such a burnishing drill comprises a cylindrical drill body 2 connected with a shank 1, the drill body 2 includes cutting edges 5, formed therein, at the tip 3 thereof, and opposed to each other diametrically about the longitudinal axis of the drill body 2. Each of the cutting edges 5 includes a slant face 6 extending therefrom rearwardly in the direction of rotation (shown by arrow A in FIG. 5) and a guide face 7 axially extending from the edge of the slant face 6. The drill body 2 further includes a longitudinally extending relief surface 8 formed therein between each of the cutting edges 5 and the corresponding guide face 7 at the outer wall of the drill body 2 and a longitudinally extending relief groove 9 formed in the drill body 2.

This drill does not have good centering and stabilizing properties since the initial bite cannot be properly made. As a result, the drilled hole made is excessively reamed and its inner wall is rough.

SUMMARY OF THE INVENTION

It is therefore an object of the present invention to provide an improved vertical feed type burnishing drill having increased bite performance thereby improving the centering and stabilizing properties.

Another object of the present invention is to provide an improved vertical feed type burnishing drill which will not ream the drilled hole excessively and can provide a drilled hole with a smoother inner wall.

To this end, the present invention provides a vertical feed type burnishing drill comprising a shank and a cylindrical drill body connected at one end with the shank. The opposite end of the drill body is formed with a reduced-diameter portion having its external diameter smaller than the maximum external diameter of the drill body. The said reduced-diameter portion includes first cutting edge means extending radially outwardly from the center of the forward end thereof and inclining axially in the rearward direction with a first cutting angle and second cutting edge means extending radially outward from the outer periphery of the reduced-diameter portion in a direction perpendicular to the first cutting edge means and inclining axially in the forward direction with a second cutting angle.

The vertical feed type burnishing drill of the present invention may comprise a pair of first cutting edges and a pair of second cutting edges.

The outermost radial parts of the second cutting edges are located on a circle having its radius larger than the radial distance in the first cutting edges.

In such an arrangement, the first cutting edges on the reduced-diameter portion of the drill body first drill a hole in a workpiece to be machined. The second cutting edges then ream and smoothly finish the inner wall of the hole drilled by the first cutting edges.

PREFERRED EMBODIMENT OF THE INVENTION

Figure 1:
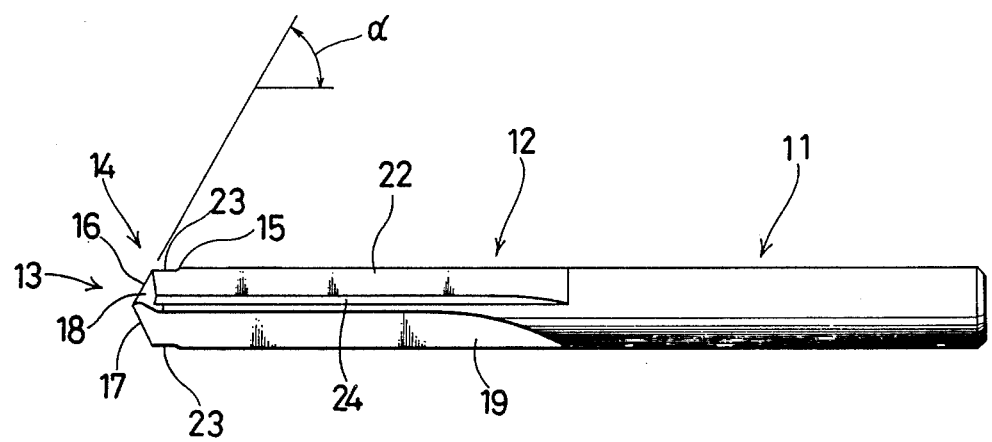
FIG. 1 is a side view of a burnishing drill constructed in accordance with the present invention.
Figure 2:
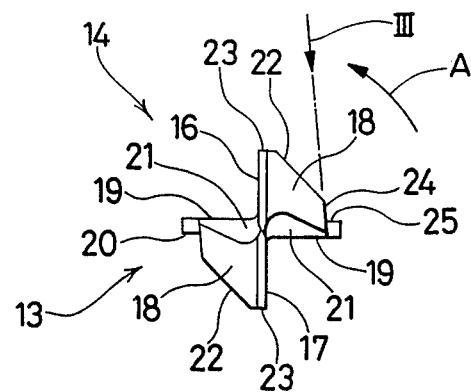
FIG. 2 is an enlarged front view of the burnishing drill shown in FIG. 1.
Figure 3:
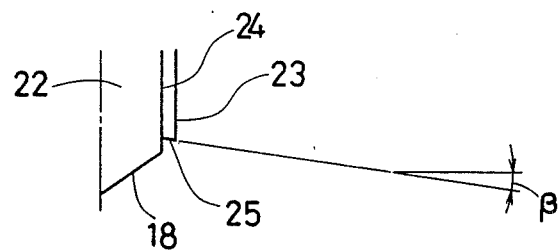
FIG. 3 is an enlarged perspective view of the burnishing drill shown in FIGS. 1 and 2 as viewed from the direction of arrow III in FIG. 2.
Figure 4:
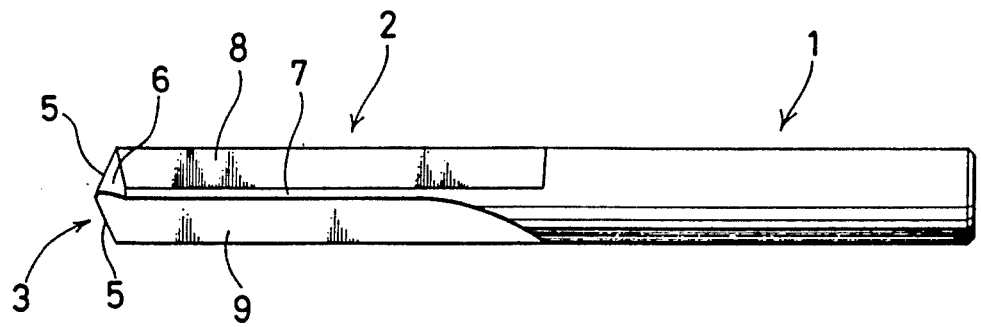
FIG. 4 is a side view of a burnishing drill constructed in accordance with the prior art.
Figure 5:
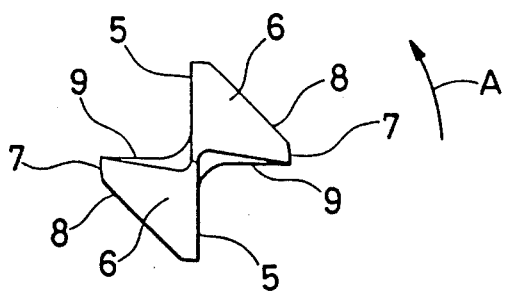
FIG. 5 is an enlarged front view of the prior art burnishing drill shown in FIG. 4.

In FIG. 1 through 3, a burnishing drill constructed according to the present invention is shown.

The burnishing drill comprises a shank 11 and a cylindrical drill body 12 connected at one end with the shank 11. The opposite or forward end 13 of the drill body 12 includes a reduced-diameter portion 14 formed therein which has an external diameter smaller than the maximum external diameter of the drill body 12. The reduced-diameter portion 14 is connected with the maximum diameter portion of the drill body 12 through a step 15.

The forward end of the reduced-diameter portion 14 most remote from the shank 11 is formed with a pair of first cutting edges 16 and 17 with a first cutting angle α with respect to the axis of the shank 11. Cutting edges 16 and 17 incline radially rearward from the forwardmost end of the reduced-diameter portion 14. The outermost wall of first cutting edge 16 and first cutting edge 17 communicates with the corresponding guide face 23 in the reduced-diameter portion 14. First cutting edges 16 and 17 also communicate with a slant face 18 extending radially outward therefrom and inclining axially rearward in a direction opposite to the direction of rotation in the drill body 12 (shown by arrow A in FIG. 2).

A relief surface 22 extends axially rearward from the outermost rearward edge of each of the slant faces 18. The axial rearwardmost end of each relief surface 22 is connected with the shank 11.

A relief portion 21 is formed in the root of each of the first cutting edges 16 and 17, which root is located at a position nearer to the shank than the forward center of first cutting edges 16 and 17. A first relief groove 19 extends axially from the relief portion 21 toward the shank 11.

Second cutting edges 20 and 25 are formed on the drill body 12 at its outermost and forwardmost end in a direction perpendicular to the plane including the first cutting edges 16 and 17, as viewed in FIG. 2. Each of the second cutting edges 20 or 25 extends radially outward from a position inward of the outermost wall of the corresponding first cutting edges 16 or 17 and inclines axially forward from said position. The second cutting edges 20 and 25 have the same but opposite cutting angle $\beta$. The outermost wall of each of the second cutting edges 20 or 25 is located in a circle having a radius larger than the radial distance of the first cutting edges 16 and 17. Thus, the second cutting edges 20 and 25 have a larger initial bite than first cutting edges 16 and 17. A second relief groove 24 extends axially rearward from each of the second cutting edges 20 or 25 toward the shank 11.

When the burnishing drill of the present invention is rotated in the direction of arrow A as viewed in FIG. 2, the first cutting edges 16 and 17 first drill a hole in a workpiece. The second cutting edges 20 and 25 then ream and smoothly finish the inner wall of the hole drilled by the first cutting edges 16 and 17. The rotational center of the first cutting edges 16 and 17 coincides with that of the second cutting edges 20 and 25. As a result, the centering and stabilizing properties of the burnishing drill can be widely improved.

Figure 6:
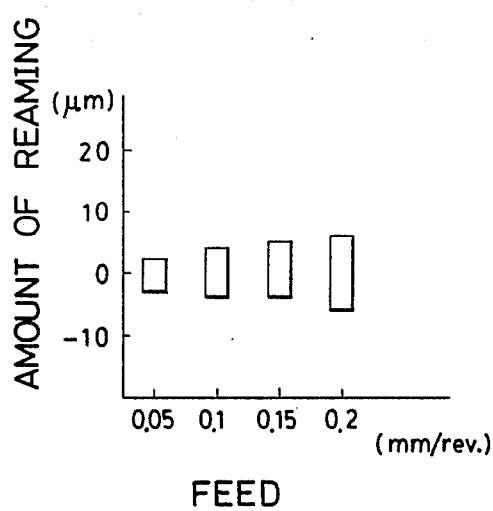
FIG. 6 is a graph illustrating the relationship between the feed and the amount of reaming in the burnishing drill according to the present invention.
Figure 8:
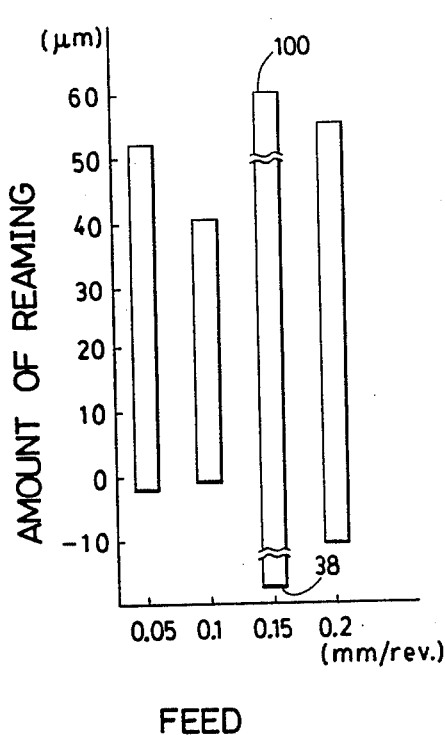
FIG. 8 is a graph similar to FIG. 6, illustrating the properties of the prior art burnishing drill.

As will be apparent when comparing FIG. 6 with FIG. 8, the prior art burnishing drill increased the diameter of the drilled hole excessively irrespective of the feed in the drill when the hole was reamed. In contrast, the burnishing drill of the present invention did not increase the diameter of the drilled hole excessively irrespective of the feed in the drill in the reaming process.

Figure 7:
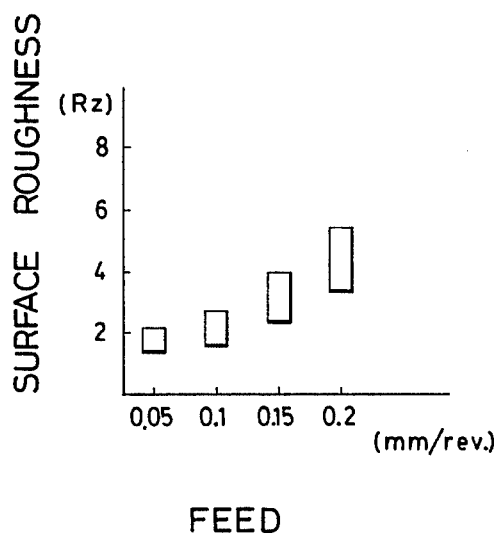
FIG. 7 is a graph illustrating the relationship between the feed and the surface roughness in the hole drilled and reamed by the burnishing drill according to the present invention.
Figure 9:
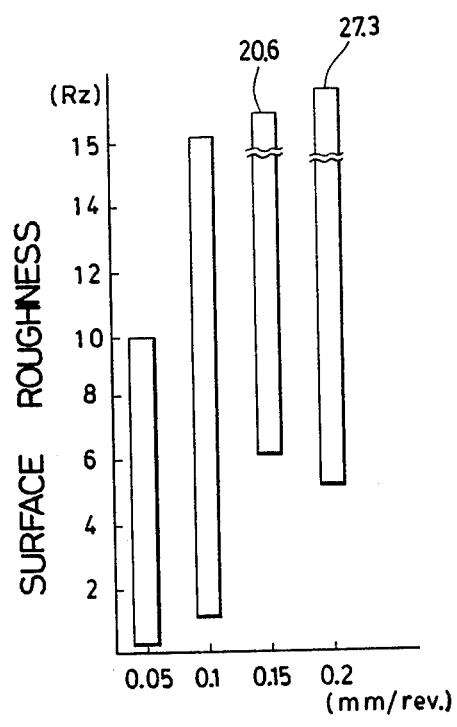
FIG. 9 is a graph similar to FIG. 7, illustrating the properties of the prior art burnishing drill.

As will be also apparent when comparing FIG. 7 with FIG. 9, the prior art burnishing drill provided a reamed hole with an inner wall whose surface was rough and irregular. The surface roughness in the inner wall of the hole increased as the feed of the burnishing drill was increased. In contrast, the burnishing drill of the present invention provides a reamed hole with an inner wall whose surface was less rough. Even if the feed of the drill was increased, the maximum surface roughness remained very small providing a smoother inner wall for the drilled and reamed hole.

As will be apparent from the foregoing, the present invention provides an improved burnishing drill which can drill a hole in a workpiece by the first cutting edges formed on the reduced-diameter portion of the drill body and ream the drilled hole by the second cutting edges formed on the same reduced-diameter portion thereby producing an inner wall with an improved smoothness. Further, since the first and second cutting edges are rotated about the same axis of rotation, a hole having a relatively small diameter can be drilled and the drilled hole can be reamed to provide an accurately and smoothly finished wall for a hole from the top opened end to the bottom closed end. In addition, the second cutting edges formed on the forward portion of the drill body in the direction perpendicular to the plane including the first cutting edges can have an improved initial bite in the workpiece resulting in an improvement of the stabilizing property in the burnishing drill.

While the invention has been described in connection with what is presently considered to be the most practical and preferred embodiment, it is to be understood that the invention is not limited to the disclosed embodiment but, on the contrary is intended to cover various modifications and equivalent arrangements included within the spirit and scope of the appended claims.

WHAT IS CLAIMED IS:

1. A vertical feed type burnishing drill comprising:
   a shank;
   a cylindrical drill body connected at one end with said shank, the opposite end of said drill body being formed with a reduced-diameter portion having its external diameter smaller than the maximum external diameter of said drill body;
   first cutting edge means being formed to extend diametrically in said reduced-diameter portion, extending radially outward from the center of the forward end of said reduced diameter portion, and inclining axially in the rearward direction with a first cutting angle; and
   second cutting edge means being formed substantially perpendicular to said first cutting edge means, extending radially outward from a position inward of the outermost peripheral wall of said first cutting edge means, and inclining axially in the forward direction with a second cutting angle.

2. A vertical feed type burnishing drill as defined in claim 1 wherein said first cutting edge means comprises a pair of first cutting edges and said second cutting edge means comprises a pair of second cutting edges.

3. A vertical feed type burnishing drill as defined in claim 1 wherein the outermost radial part of the second cutting edge means are located on a circle having its radius larger than the radial distance in the first cutting edge means.

* * * * *